United States Patent [19]

Sauter et al.

[11] Patent Number: 5,664,692
[45] Date of Patent: Sep. 9, 1997

[54] MOBILE CRANE HAVING A RELEASABLE COUPLING CONNECTING THE LOWER CARRIAGE WITH THE UPPER CARRIAGE

[75] Inventors: Herbert Sauter, Biberach; Hans-Dieter Willim, Ulm/Unterweller, both of Germany

[73] Assignee: Liebherr-Werk Ehingen GmbH, Ehingen/Donau, Germany

[21] Appl. No.: 618,835

[22] Filed: Mar. 20, 1996

[30] Foreign Application Priority Data

Mar. 28, 1995 [DE] Germany .................. 295 05 262.7
May 23, 1995 [DE] Germany .................. 295 08 567.3

[51] Int. Cl.[6] ............................................. B66C 23/84
[52] U.S. Cl. .................................. 212/181; 212/253
[58] Field of Search ............................ 212/181, 253, 212/180

[56] References Cited

U.S. PATENT DOCUMENTS

| 3,921,817 | 11/1975 | Petrik et al. | 212/181 |
| 4,248,488 | 2/1981 | Sable | 212/181 |
| 5,018,630 | 5/1991 | McGhie | 212/253 |
| 5,176,267 | 1/1993 | Pech | 212/253 |

*Primary Examiner*—Thomas J. Brahan
*Attorney, Agent, or Firm*—Lowe, Price, LeBlanc & Becker

[57] ABSTRACT

A mobile crane includes a releasable coupling for connecting the upper and lower carriages together in a simple and rapid manner through a holding ring connected with the lower carriage and an axial cylindrical ring extension of an externally toothed ring which is rotatably mounted on the upper carriage. Both the holding ring and the ring extension are provided with ribs which interlock to transmit relative rotation and easily de-couple. A bayonet joint type of coupler ensures reliable coupling of the externally toothed ring with the holding ring.

12 Claims, 5 Drawing Sheets

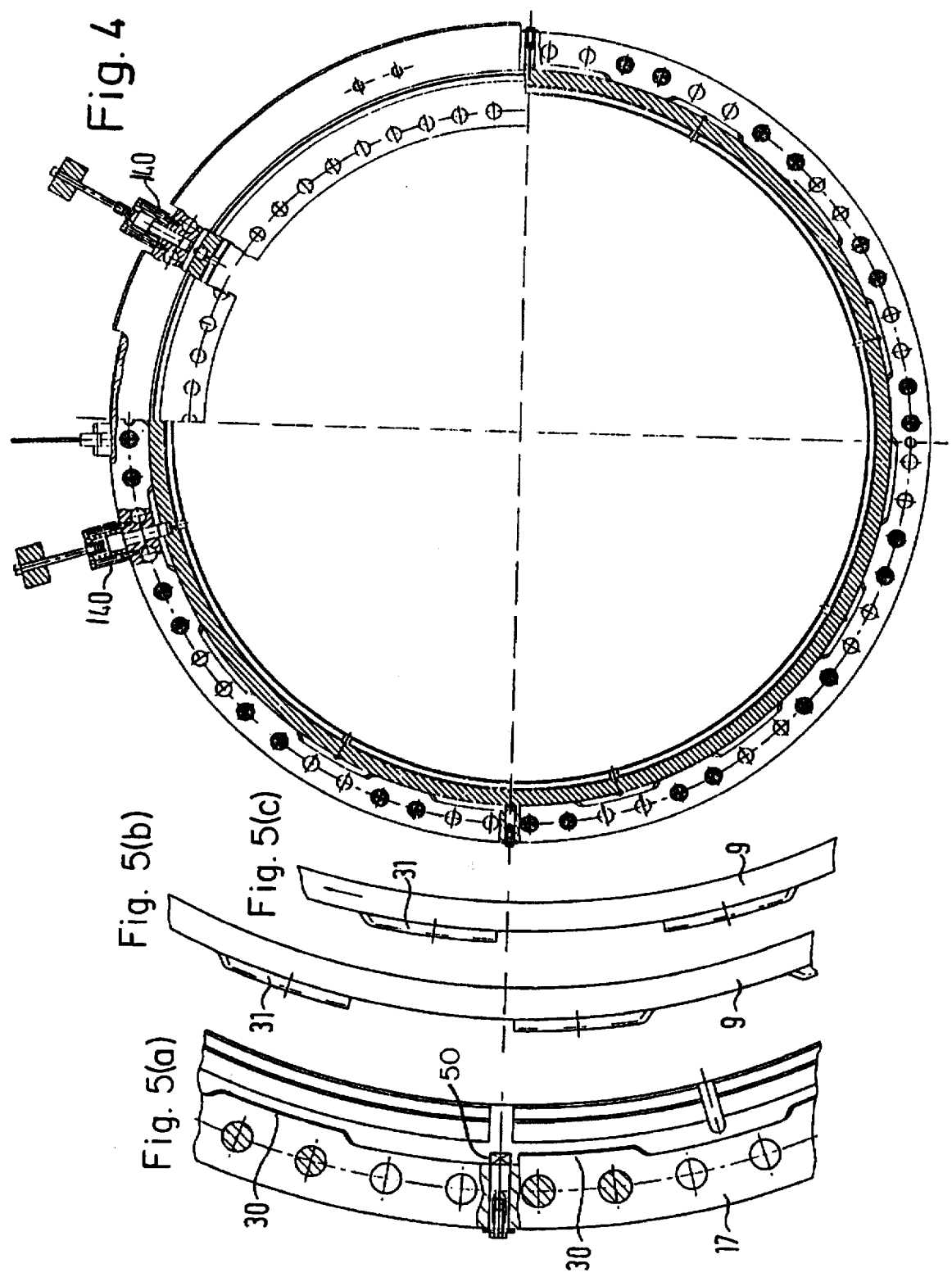

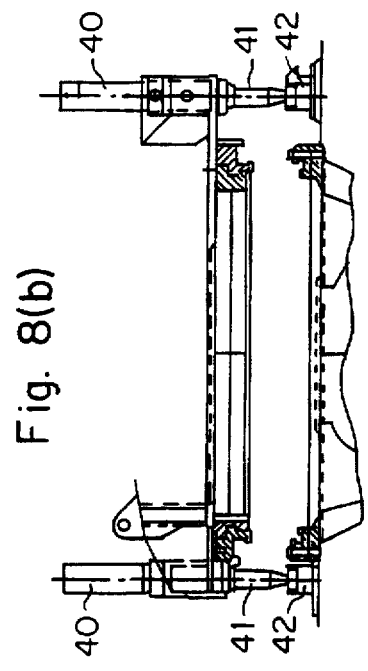
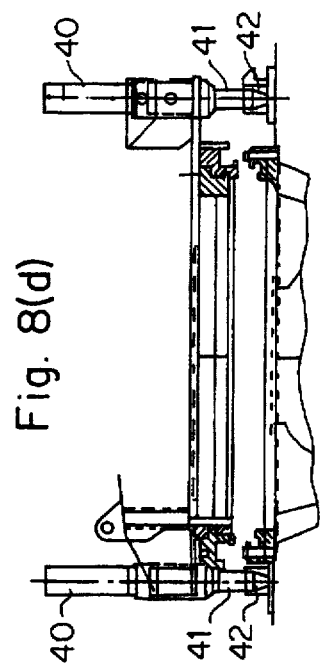
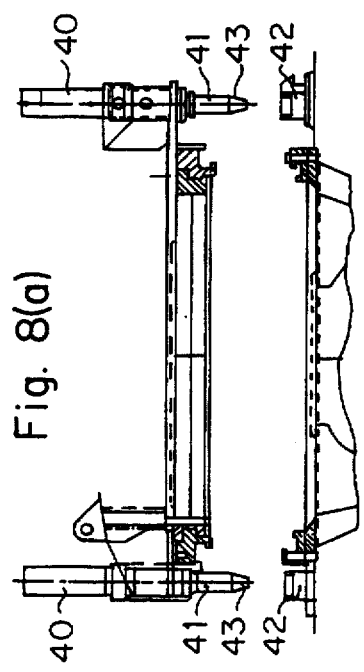
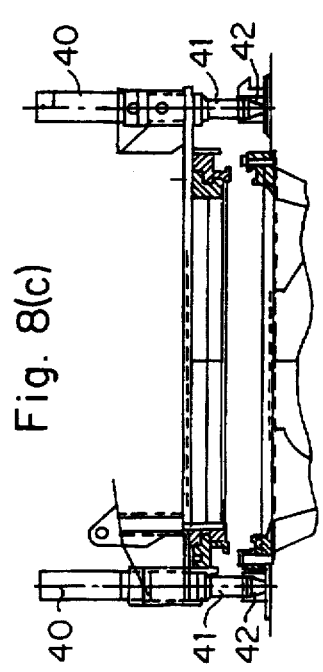
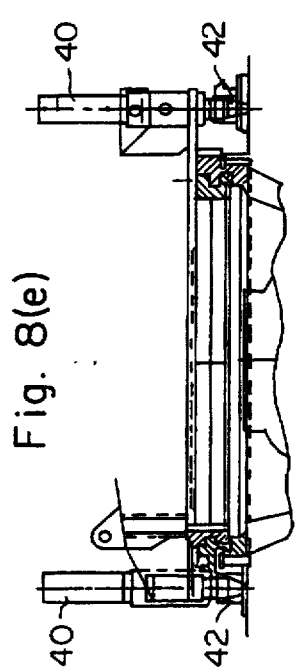

# MOBILE CRANE HAVING A RELEASABLE COUPLING CONNECTING THE LOWER CARRIAGE WITH THE UPPER CARRIAGE

BACKGROUND OF THE INVENTION

1. Field of the Invention

The invention relates to a mobile crane having a releasable coupling connecting the lower carriage with the upper carriage and a ring which is held on the lower carriage in such a manner as to prevent relative rotation and has external gear teeth meshing with a drive pinion rotatably mounted on the upper carriage.

2. Description of the Related Art

In the case of mobile or vehicle-mounted cranes with a high lifting capacity both the lower carriage and also the upper carriage with the jib are so heavy that separate transport of the upper carriage together with the jib is called for on a customized transport vehicle such as a low loader. For this purpose the upper carriage, movably mounted on the lower carriage, must be able to be detached therefrom. In this respect there is a requirement that the coupling connecting with the lower carriage should not lead to a significant increase in the height of such a vehicle-mounted crane so that the clearance height thereof is not undesirably changed.

SUMMARY OF THE INVENTION

One object of the invention is to provide a mobile crane of the type initially mentioned, in the case of which the upper carriage can be simply and rapidly detached from the lower carriage and may be simply and rapidly mounted thereon and be coupled with same without the coupling leading to any significant increase in the clearance height of the crane vehicle.

In accordance with the invention this aim is attained with a mobile crane of the type initially mentioned because the coupling comprises a holding ring connected with the lower carriage and an axial cylindrical ring extension of the externally toothed ring rotatably mounted on the upper carriage, the holding ring is provided with radially and inwardly directed claw-like ribs and the ring extension is provided with radially outwardly directed extending claw-like ribs, such ribs being evenly distributed about the periphery and at least partially spanning a common annular space, concentric to the axis of rotation and being at such a distance from one another that the ribs of the one part may be inserted into the gaps between ribs on the other part in an axial direction in mutually offset planes, in which planes, by rotation of the toothed ring, they interlock moving into the coupled position.

The coupling of the invention involves a bayonet joint type of coupling action of the externally toothed ring with the holding ring, the mutually interlocking claw-like ribs occupying approximately half of the periphery of the holding ring so that same may take up or, respectively, transmit heavy forces.

The dismounting and mounting of the upper carriage from and, respectively, on the lower carriage is performed using an erection crane. Prior to dismounting the locking means (which may comprise a radial locking bolt extending through aligned hole sections in both rings) between the externally toothed ring and the holding ring is released. The rotation of the externally toothed ring in the uncoupled setting is then performed using the drive pinion, a bolt connection or the like being produced between the upper carriage and the lower carriage connecting same together in order during rotation of the externally toothed ring into the uncoupled setting to prevent entrainment in rotation of the upper carriage. As soon as the externally toothed ring has been turned in relation to the holding ring into its unlocked position, the upper carriage may be lifted off vertically upward and deposited on the separate transport vehicle, as for example a low loader.

The placing of the upper carriage on the lower carriage is then performed in a reverse order of operations by lowering the upper carriage with an erection crane vertically down on the lower carriage in such a manner that the claw-like ribs, arranged in a circular ring, of the externally toothed ring are fitted into the gaps between the ribs on the holding ring and are lowered down into the locking plane. After this the connection arresting the upper carriage in relation to the lower carriage is produced, it being for example in the form of a bolt connection so that after this simply by actuation of the drive pinion it is possible for the externally toothed ring to be turned into its coupled position so that reverse rotation into the uncoupled position is out of the question. Furthermore the temporary locking effect, only performed for assembly, of the upper carriage in relation to the lower carriage is released again which is a type of torque take-up means.

The bayonet connection in accordance with the invention may be designed with only an extremely small addition to the overall height of the mobile crane. In the case of the mobile crane in accordance with the invention the externally toothed ring remains connected with the upper carriage even after lifting the upper carriage so that the drive pinion remains in engagement with the gear teeth of the ring. This means that there is not only a simplification of lifting and lowering down into position but furthermore the drive pinion, which is normally present in any case for rotation of the crane's upper carriage in relation to the lower carriage, may be employed to turn the externally toothed ring into its coupled setting.

It is convenient for the rotation of the externally toothed ring into its coupled to be limited by an abutment.

In accordance with a preferred development of the invention there is a provision such that the toothed ring is provided with an internal radial annular rib, whose end surfaces lying in radial planes form annular running surfaces for cylindrical or, respectively, slightly coned rolling elements of the axial bearing connecting the toothed ring with the upper carriage, furthermore the upper running surface of the bearing intersects the imaginary prolongation of the cylindrical ring extension and the lower running surface is offset in relation to same radially inward, and furthermore the ring extension has its lower end surface bearing against a radially inwardly directed edge of the holding ring. Since the upper rolling elements transmit the vertical forces, same are transmitted in a torque-free fashion via the cylindrical ring extension of the ring provided with the external teeth to the foot of the holding ring or, however, to an annular pressure plate so that there is an expedient transmission of the thrust forces to the externally toothed ring or counter-abutment of the lower carriage.

An other preferred feature of the invention is such that the holding ring is provided with an external ring step, on whose radial end surface the externally toothed ring may bear at its annular shoulder constituted by a cylindrical extension. This design is particularly appropriate in conjunction with a further development of the invention such that the lower running surface of the annular rib is designed in the form of an inwardly and downwardly inclining oblique portion. If the upper carriage is not transmitting forces, or only light forces, via the lower rolling elements to the lower running surface of the externally toothed ring, it is possible to tolerate the fact that the upper circumferential surface lines of the rolling elements assume a slightly acute angled setting in relation to the running surfaces. If tilting forces wax, the lower rolling elements acted upon by the tilting forces will have to transmit greater forces to the running surface of the bearing so that such forces have the effect of twisting the corresponding ring section of the externally toothed ring to the outside with the result that the claw-like ribs come into meshing engagement and the externally toothed ring will have its outer ring shoulder bearing on the ring step of the holding ring. Owing to such twist acting on the section, subject to the tilting forces, of the ring the associated section of the running surface of the ring-like rib will be lifted clear so that the slight oblique setting of the running surfaces will be corrected and the rolling elements may bear on the running surface for the full length of their circumferential surface lines and are able to transmit maximum forces.

The design in accordance with the invention of the bearing between the externally toothed ring and the internal bearing elements of the upper carriage thus excludes any possibility of skew running of the bearing likely otherwise to occur if the two running surfaces for the rolling elements are in alignment with one another in the axial direction.

Regarding the connection of the upper carriage with the lower carriage there is the problem that for the purpose of coupling the parts to be coupled with one another same must be very exactly aligned so that when the coupling parts are put together, no damage occurs. In accordance with a further design of the invention, for which independent protection is claimed, there is consequently a provision such that the upper carriage is provided with at least two fluid driven cylinders whose center lines are parallel to the center line of the externally toothed ring, piston rods of such cylinders being provided with centering tips for fitting into centering holes in the lower carriage. On putting the upper carriage in place for the purpose of couplingly connecting same with the lower carriage the piston rods furnished with centering tips are run out of the fluid driven cylinders so that same may be moved into the holes for the purpose of preliminary centering. Once such preliminary centering is completed, the upper carriage is lowered fully so that the parts to be coupled together engage one another in a centered form and after moving the coupling parts together locking may take place.

It is convenient furthermore if the fluid driven cylinders are hydraulic cylinders from which, after the introduction of the centering tips into the holes on lowering the upper carriage on the lower carriage, fluid under pressure will be displaced from the cylinder through an excess pressure valve. Owing to such displacement it is possible for the upper carriage to be slowly lowered on the lower carriage, the parts to be coupled together being caused to approach each other in centered alignment.

BRIEF DESCRIPTION OF THE DRAWINGS

One working embodiment of the invention will now be described with reference to the drawings in more detail.

FIG. 4 is a plan view of the rings in the coupled state with a horizontal section taken along the line IV—IV of FIG. 1.

FIG. 5a shows a plan view of a portion of the holding ring.

FIG. 5b shows the position of the associated portion of the ring in the screwed in an hence locked state.

FIG. 5c shows the setting of the respective section of the ring in the unlocked state.

FIGS. 8a to 8e show the different stages of outward movement of the centering cylinders and the fitting of the centering tips of the piston rods into the centering holes in successive stages.

DESCRIPTION OF THE PREFERRED EMBODIMENTS

Figure 1:
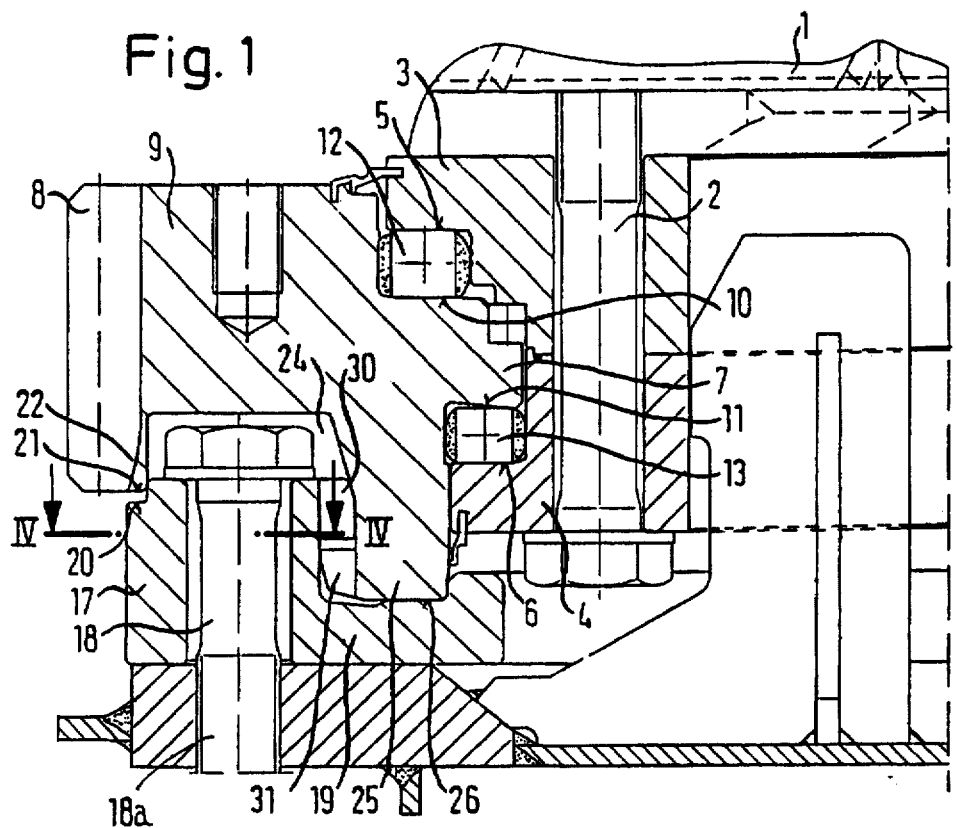
FIG. 1 shows a section taken through the externally toothed ring and the holding ring in the coupled state of the upper carriage and the lower carriage in the untwisted condition of the section of the ring illustrated.

An upper race ring 3 and a lower race ring 4 are screwed to the upper carriage 1 by means of a circular array of waisted bolts 2. The upper race ring is provided with a running surface 5 and the lower race ring is provided with a running surface 6. A radial annular rib 7 fits into an annular groove comprising the running surfaces 5 and 6 and forms part of a ring 9 provided with an external teeth 8, such ring 9 being provided with bearing tracks 10 and 11, which in the axial direction are parallel to the bearing running surfaces 5 and 6. Cylindrical or spherical rolling bearing elements 12 run on the bearing running surfaces 5 and 10, whereas cylindrical or slightly coned or spherical rolling bearing elements 13 run on the bearing running surfaces 6 and 11. The bearings with the bearing elements 12 and 13 serve to rotatably connect the externally toothed ring 9 with the race rings 3 and 4 of the upper carriage 1.

A holding ring 17 is bolted to the lower carriage 16 by means of a circular formation of waisted bolts 18. The holding ring 17 possesses an internal flange-like ring extension 19 resembling a foot, structure as part of the holding ring 17.

On its outer upper edge the holding ring 17 is furnished with a ring step 20, on which an annular shoulder of the externally toothed ring bears, such shoulder being constituted by an external cylindrical extension 22.

By means of an annular groove 24 an internal cylindrical ring extension 25 is separated off from the external cylindrical extension 22, such extension 25-bearing against an annular supporting surface 26 of the flange-like foot 19 of the holding ring 17. The part, provided with the screw thread 18a, of the holding ring 17 fits partially into the groove, formed between the cylindrical extensions 22 and 25, of the externally toothed ring 9.

The bearing running surface 10 of the externally toothed ring 9 is above the level of the cylindrical ring extension 25 so that the thrust forces transmitted via the bearing elements 12 are passed directly via the cylindrical ring extension 25 to the support surface 26 in the internal flange-like foot part 19 of the holding ring 17 without rotation of the ring 9 being caused thereby.

The bearing running surface 11 on the radial annular rib 7 of the externally toothed ring 9 is inwardly offset toward the running surface 10 so that twisting tilting forces are taken up by mutually interlocking claw-like ribs 30 and 31 and the annular shoulder 21, bearing against the ring step 20 of the externally toothed ring 9.

The claw-like ribs 30 and 31 are on one side arranged to project radially inward on the holding ring 17 and to project radially outward on the cylindrical ring extension 25 of the externally toothed ring 9.

As shown in FIG. 1 the lower bearing running surface 11 of the radial annular rib 7 of the externally toothed ring 9 is designed to be slightly conical with an oblique slope directed inward. If the bearing elements 13 are to resist a tilting moment (see FIG. 2), thrust forces will act on the bearing surface 11 in the direction of the arrow A, which tend to twist the corresponding ring section of the externally toothed ring 9 in the direction of the arrow B. Owing to these reaction forces the bearing surface will be raised so that the bearing elements 13 may run along the length of their circumferential surface lines on the same and can transmit maximum reaction forces. Owing to the twisting, caused by the reaction forces, of the corresponding ring section of the externally toothed ring 9 the claw-like ribs 30 and 31 come into meshing engagement in the ring section and the annular shoulder 21 will bear against the ring step 2. Accordingly the entire connection is very stiff without this leading to skew positioning or jamming of the bearing elements 12 and 13.

Figure 2:
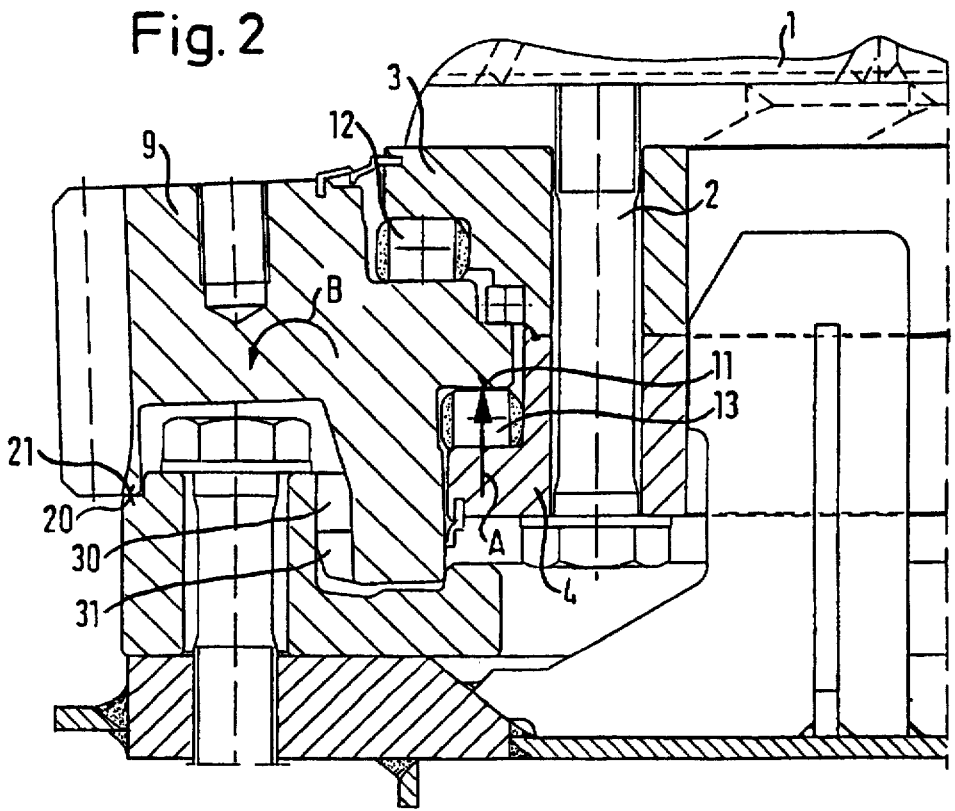
FIG. 2 is an elevation similar to that of FIG. 1, in the case of which however the illustrated section of the externally toothed ring is twisted owing to a tilting moment.
Figure 3:
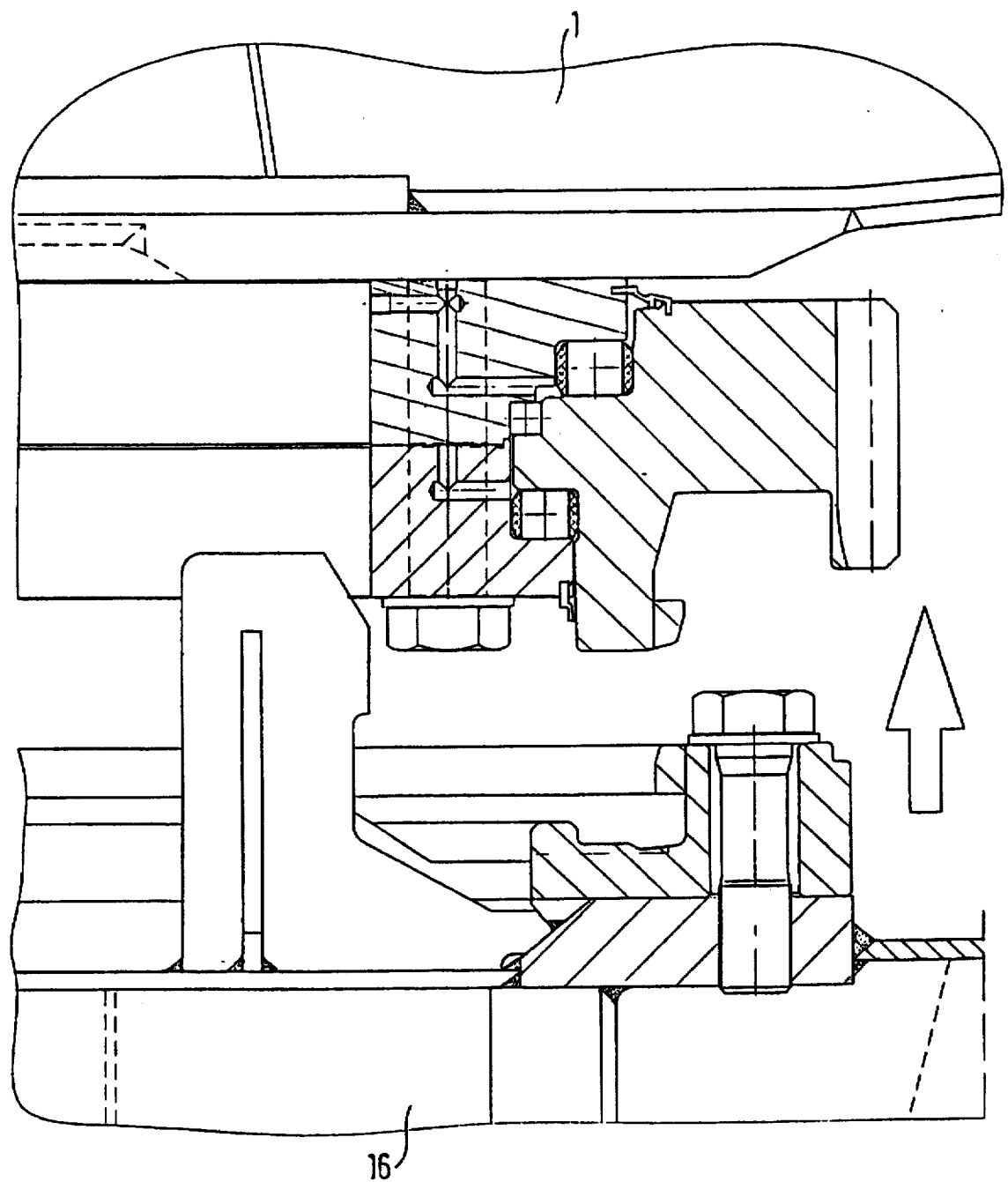
FIG. 3 shows a section taken through the externally toothed ring and the holding ring in the state detached from one another in the course of mounting or dismounting of the upper carriage on or, respectively, from the lower carriage.

In order to provide for easier comprehension of FIGS. 1 and 2 FIG. 3 shows the upper carriage 1 and the lower carriage 16 separated apart.

In FIG. 4 the state of the holding ring 17 locked to the ring 19 is illustrated. In the left hand upper quadrant the reader will see a locking bolt 140 employed for locking and extending radially through aligned holes in both rings in the driven home state thereof (locking condition). In the right hand upper quadrant such bolt 140 is depicted in the withdrawn state thereof.

Using FIGS. 5a through 5c a further description will be provided of the relative position of the rings 9 and 17 in the disconnected and, respectively, unlocked state on the one hand and in the locked state on the other hand.

FIG. 5a shows a plan view of a section of the holding ring 17. In FIG. 5a abutment 50 is shown. In FIGS. 5b and 5c two showings of a respective section of the ring 9 are to be seen. The reader will see that the ribs 31 of the ring 9 are arranged in the same positions as the ribs 30 on the holding ring 17. In this condition the ribs 30 and 31 interlock with each other so that in this condition the upper carriage can not be separated from the lower carriage by simple lifting. The angular position necessary for this of the ring 9 in relation to the holding ring 17 is represented in FIG. 5c. It will be here that the ribs 31 on the ring 9 are so arranged between the ribs 30 on the ring 17 that the ribs 30 and 31 do not interlock and separation of the lower carriage and the upper carriage is readily possible.

Figure 6:
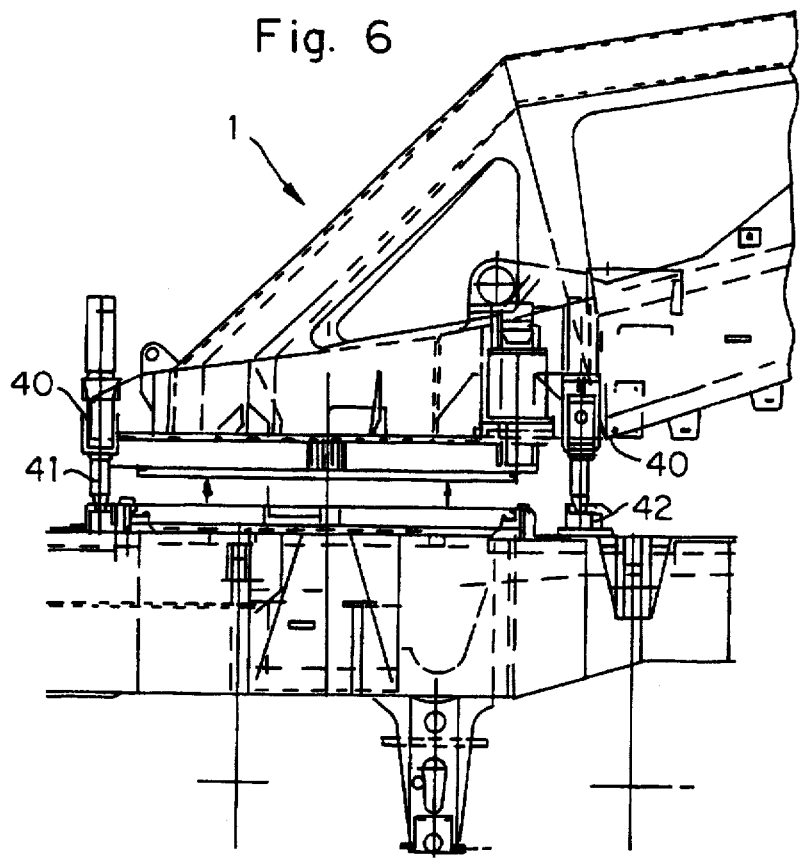
FIG. 6 shows a side view of the parts, to be coupled together, of the upper carriage and the lower carriage in the course of preliminary centering, in which the centering tips of the hydraulic cylinders are just proceeding to fit into the centering holes.
Figure 7:
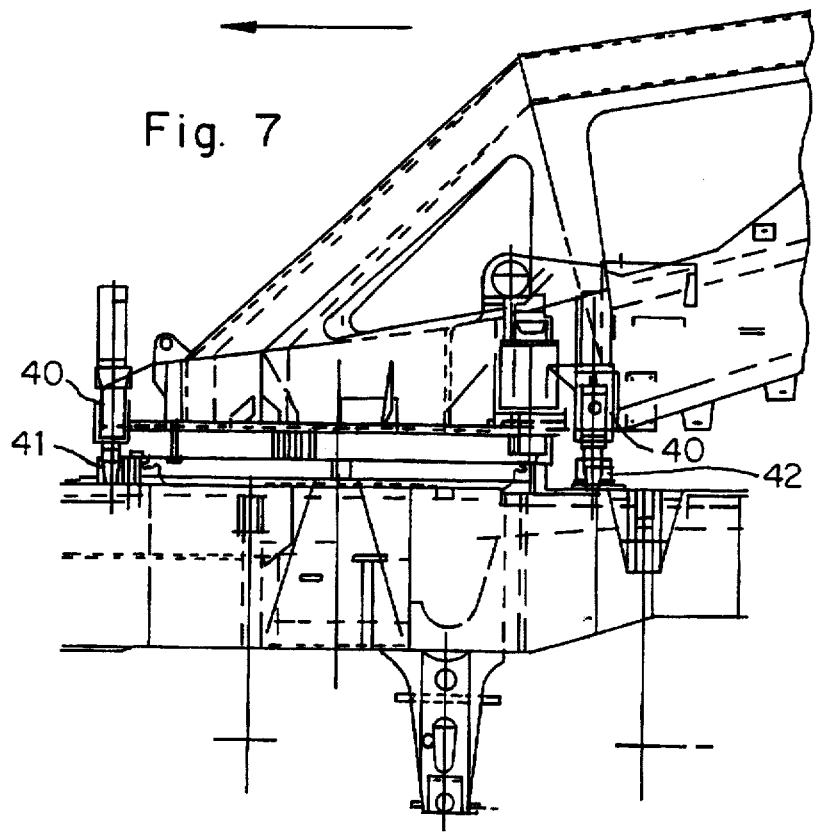
FIG. 7 shows a view corresponding to FIG. 6 in which the upper carriage is mounted on the lower carriage in a centered manner.

As shown in FIGS. 6 and 7 hydraulic cylinders 40 are connected with parts of the structure of the upper carriage 2, vertical center lines of such cylinders extending in parallelism to the center line of the externally toothed ring 9. Piston rods 41 are able to be driven out of the hydraulic cylinders 40 and bear centering tips 43. For centering the upper carriage in the course of placing same on the lower carriage the lower carriage is provided with centering holes 42, which in their position in relation to the centering cylinders are so aligned that after fitting of the piston rods 41 in the centering holes the parts to be coupled are moved together in the correct setting and may then be locked.

FIG. 6 indicates the situation in which conical centering tips have just been fitted into the centering hole, a task readily performed owing to the diameter of the centering hole.

In FIG. 7 the situation is shown in which after centering engagement of the piston rods 41 in the centering holes 42 centering of the coupling parts takes place and the upper carriage has been lowered on the lower carriage following centered movement together of the coupling parts.

FIGS. 8a through 8d show the different phases in the course of centered joining together of the upper carriage and the lower carriage or, respectively, of the centering parts.

FIG. 8a shows the condition wherein the piston rods 21 have been extended for the purpose of fitting in the centering holes 42 to exert a centering action.

FIG. 8b shows the situation in which the conical centering tips of the piston rod are just entering the centering holes 42.

FIG. 8c shows the parts to be coupled together after preliminary centering using the centering cylinders. After such centering piston rods are moved in by displacement of hydraulic oil from the centering cylinders until the parts to be coupled together have been moved home in the fashion indicated in FIG. 8e so that only locking has to take place.

We claim:

1. A mobile crane, comprising:

an upper carriage having external gear teeth;

a lower carriage releasably coupled to said upper carriage;

a drive pinion rotatably mounted to said upper carriage and having gear teeth meshing with said external gear teeth of said upper carriage;

a coupling having a holding ring connected to the lower carriage and an externally toothed ring rotatably mounted on said upper carriage which includes said external gear teeth;

said holding ring having radially inwardly extending ribs and said externally toothed ring having radially outwardly extending ribs, said ribs being equally spaced and having gaps therebetween and at least partially spanning a common annular space and being concentric to an axis of rotation of said upper carriage;

wherein said radially outwardly extending ribs of said external toothed ring are movable from an uncoupled position where said upper carriage and said lower carriage are uncoupled, a connected position where said upper and lower carriages are connected but not interlocked, and an interlocked position where said upper carriage and said lower carriage are coupled and interlocked by rotation of said externally toothed ring; and wherein said drive pinion and said externally toothed ring on said upper carriage remain meshed when said external toothed ring is in said uncoupled position, said connected position and said interlocked position.

2. The mobile crane as claimed in claim 1, wherein the rotation of the externally toothed ring into the interlocked position is limited by an abutment.

3. The mobile crane as claimed in claim 1, wherein the externally toothed ring is provided with an internal radial annular rib whose end surfaces lying in radial planes form annular running surfaces for rolling elements of the axial bearing connecting the toothed ring with the upper carriage in that the upper running surface of the bearing intersects the imaginary prolongation of the cylindrical ring extension and the lower running surface is offset in relation to same radially inward, and in that the ring extension has its lower end surface bearing against a surface.

4. The mobile crane as claimed in claim 3, wherein said rolling element is cylindrical.

5. The mobile crane as claimed in claim 3, wherein said rolling element is conical.

6. The mobile crane as claimed in claim 3, wherein said surface is a radially directed edge of the holding ring.

7. The mobile crane as claimed in claim 3, wherein said surface is a counter abutment on the lower carriage.

8. The mobile crane as claimed in 1, wherein the holding ring is provided with an external ring step on whose radial end surface the externally toothed ring may bear by way of an annular shoulder constituted by a cylindrical extension.

9. The mobile crane as claimed in claim 1, wherein the lower bearing surface of the annular rib is slightly coned with an oblique form sloping inward and downward.

10. The mobile crane as claimed in claim 1 wherein between the external cylindrical extension and the internal cylindrical ring extension the externally toothed ring is provided with an annular groove into which the ring part of the holding ring fits which has a screw thread.

11. The mobile crane as claimed in claim 1, the upper carriage is provided with at least two fluid pressure operated cylinders with center lines thereof in parallelism to the center line of the externally toothed ring, centering tips of the piston rods thereof fitting into centering holes in the lower carriage.

12. The mobile crane as claimed in claim 11, wherein the fluid pressure operated cylinders are hydraulic cylinders from which after introduction of the centering tips into the centering holes on mounting the upper carriage on the lower carriage fluid under pressure is displaced from the cylinders through excess pressure valves.

* * * * *